US012766440B2

(12) United States Patent
McDaniel et al.

(10) Patent No.: US 12,766,440 B2
(45) Date of Patent: Oct. 20, 2026

(54) AIR SEPARATION SYSTEM FOR PURGING HYDRONIC LOOPS

(71) Applicant: PURGE RITE, LLC, Willis, TX (US)

(72) Inventors: Kristopher Matt McDaniel, Willis, TX (US); Casey Dove, Willis, TX (US); Joseph George Land, III, Willis, TX (US)

(73) Assignee: PURGE RITE, LLC

( * ) Notice: Subject to any disclaimer, the term of this patent is extended or adjusted under 35 U.S.C. 154(b) by 0 days.

(21) Appl. No.: 19/096,677

(22) Filed: Mar. 31, 2025

(65) Prior Publication Data

US 2026/0295470 A1 Oct. 1, 2026

(51) Int. Cl.
*B01D 19/00* (2006.01)
*C02F 1/20* (2023.01)

(52) U.S. Cl.
CPC ............ *B01D 19/0047* (2013.01); *C02F 1/20* (2013.01)

(58) Field of Classification Search
CPC .................................. B01D 19/00; C02F 1/20
See application file for complete search history.

(56) References Cited

U.S. PATENT DOCUMENTS 2,393,393 A * 1/1946 Mcdermet .......... B01D 19/0057 261/115
3,555,819 A * 1/1971 Name not available .................... E21B 21/067 96/198
4,155,724 A * 5/1979 Burnham, Sr. ....... E21B 21/067 96/198
4,456,456 A * 6/1984 Pompei .................. B01D 19/00 237/63
4,555,253 A * 11/1985 Hull ...................... F16K 24/048 55/459.1
5,520,825 A * 5/1996 Rice ..................... B01D 17/045 210/DIG. 5
6,116,454 A * 9/2000 Henderson ................ F15B 1/26 220/563
6,214,092 B1 * 4/2001 Odom ..................... E21B 43/35 96/170
10,113,459 B2 * 10/2018 Severance .......... F01M 13/0416
(Continued)

FOREIGN PATENT DOCUMENTS

JP H05321902 A * 12/1993

OTHER PUBLICATIONS

Translation of JPH05321902A (Year: 1993).*
(Continued)

*Primary Examiner* — Jennifer Dieterle
*Assistant Examiner* — Phillip Y Shao
(74) *Attorney, Agent, or Firm* — Conley Rose, P.C.

(57) ABSTRACT

A system for separating entrained gases from a liquid stream includes a tank having an inlet for receiving a liquid stream containing entrained gases, a liquid outlet for discharging degassed liquid from the tank, and a separation plate disposed within a central portion of the tank. The separation plate defines a flow path of the liquid stream through the tank. The separation plate is configured to reduce the velocity of the liquid stream through the flow path. The system further includes an inlet diffuser disposed in an inlet portion of the flow path. The inlet diffuser is configured to receive the liquid stream from the inlet and reduce the velocity of the liquid stream through the flow path.

25 Claims, 8 Drawing Sheets

(56) References Cited

U.S. PATENT DOCUMENTS

| | | | | |
|---|---|---|---|---|
| 10,702,802 | B1 * | 7/2020 | Weber | B01D 21/02 |
| 11,007,458 | B2 * | 5/2021 | Johnson | B01D 21/2444 |
| 11,285,405 | B2 * | 3/2022 | Johnson | B01D 17/0217 |
| 11,396,893 | B2 * | 7/2022 | Huber | F15B 21/047 |
| 2007/0056889 | A1 * | 3/2007 | Heist | E03F 5/14<br>210/162 |
| 2008/0121289 | A1 * | 5/2008 | Kobayashi | F15B 1/26<br>137/574 |
| 2009/0100811 | A1 * | 4/2009 | Scheckel | B01D 46/42<br>55/448 |
| 2011/0284089 | A1 * | 11/2011 | Knuth | F15B 1/26<br>220/501 |
| 2014/0130676 | A1 * | 5/2014 | Daniels | B01D 19/0042<br>96/194 |
| 2017/0095755 | A1 * | 4/2017 | Langer | B01D 19/0068 |
| 2017/0203248 | A1 * | 7/2017 | Riggs | B01D 46/0031 |
| 2022/0314143 | A1 * | 10/2022 | Schmidt | C25B 15/083 |

OTHER PUBLICATIONS https://ameratank.com/inventory/500-bbl-21-000-gallons-open-top-frac-tank-no-walkway (Year: 2026).* https://web.archive.org/web/20221130235147/https://www.genevaequipment.com/blog/closer-look-at-gas-buster-tanks (Year: 2022).*

* cited by examiner

AIR SEPARATION SYSTEM FOR PURGING HYDRONIC LOOPS

BACKGROUND

Various systems can use water or other fluids as a heat transfer fluid. These systems can include geothermal applications, cooling water installations, or other uses. Taking geothermal installations as an example, a series of pipes or conduits can be installed to pass through a subterranean formation to extract heat therefrom. Once the pipes are installed, the system generally forms a sealed passageway for the heat transfer fluid. Prior to use of the system, the piping system must be purged or flushed to remove various contaminants that are introduced during installation as well as air or other gases that can be trapped due to the piping system being installed without the heat transfer fluid present.

When purging an underground network of hydronic loops, such as those found in large scale ground source heat pump installations, sufficient flow velocity must be achieved in the loop piping to purge air and other gases from the loops via entrainment as bubbles in the flushing water. Economically efficient purging requires purging many underground circuits simultaneously which may result in total flow rates up to 10,000 gallons per minute at the pump. This flowrate can be sufficient to remove the trapped air over time, but can lead to a high shear rate in the flowing fluid, which can result in the gases being removed forming relatively small bubbles. The air must be removed from the flowing flush fluid at a source outside of the loop piping to fully remove it from the system in order for the system to be initiated and operated.

BRIEF DESCRIPTION OF THE DRAWINGS

For a more complete understanding of the present disclosure, reference is now made to the following brief description, taken in connection with the accompanying drawings and detailed description.

DETAILED DESCRIPTION

Figure 1:
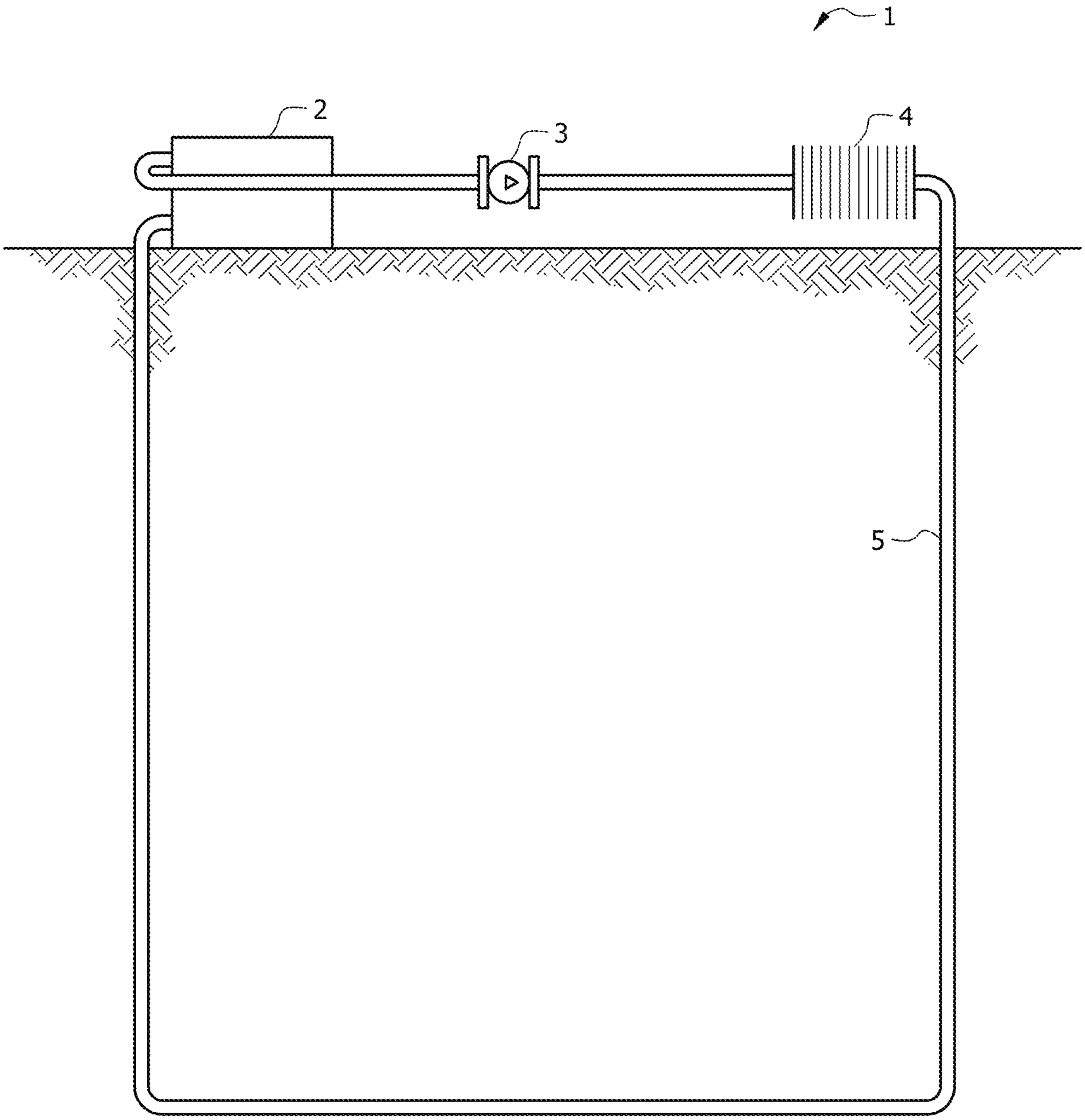
FIG. 1 is a schematic diagram of a hydronic system, according to an embodiment of the present disclosure.

The flushing of hydronic piping systems can result in high flow rates that can make separation of liquid and gases difficult to perform in small volumes. For a flushing operation, the efficiency of the flushing is improved or maximized when: (1) the entire field can be flushed simultaneously, and (2) the separator (e.g., a separation tank, etc.) is of sufficient capacity to allow for deaeration while pumping at the full flow rate required for air entrainment from the pipes within the system being flushed. The alternatives are to either purge the field in segments that are sized to allow proper deaeration with lower overall flow rates, or to alternate flow rates from a higher rate to entrain air from the field and a lower rate to allow deaeration in the tank. Either option results in a longer flushing process.

Traditionally, the liquid having the air or gases entrained (which can be referred to herein as the aerated flow) can pass through an open top tank to allow the bubbles to rise to the surface for the air or gases to escape (which can be referred to herein as a degassed or deaerated flow) before being pulled back into the closed loop circuit. The resulted degassed flow can have a substantial portion of the air or gases entrained removed, but does not require all of the air or gases to be fully removed. For example, some amount of small bubbles can remain in the liquid stream, and even if the small bubbles remain in the hydronic loop, the gas can eventually be removed through dissolution in the water stream. The liquid can then be recirculated within the closed loop circuit until all of the air has been removed. A deaeration vessel such as a frac tank can be sized for the maximum volume that can be highway transported without oversize load permitting (approximately 21,000 gallons). These full-size tanks required specialized haul trucks with special permitting and transportation limitations. For smaller system that are being flushed, a lower cost alternative with fewer transportation limitations can include a smaller tank that can be transported on a standard flatbed trailer.

An air separator according to an embodiment of the present disclosure may be sized for highway transportation without oversize load, which is made possible by features of the tank allowing for enhanced deaeration as compared with the conventional art. Flow within the separation tank (whether sized for maximum highway size or the maximum trailer haul size) may have improved total flow rate as compared with conventional deaeration equipment. This allows for effectively deaeration, which can improve or maximize the size of an underground loop network that can be purged and deaerated with an air separator of that size and/or reduce the time needed for the deaeration process. This also allows for reduced purge times and efficiencies.

The use of a smaller deaeration tank presents a number of challenges including the high velocity of the fluids and induced turbulence where the flow is introduced into the tank and the corresponding inlet conditions where the pump inlets draw from the tank. To address this issue, the gas separator tank according to the present disclosure may include a separation plate that is configured to divided the tank into multiple sections along a flow path through the tank. The separation plate can allow the fluid to enter the tank and have a reduced velocity to allow for the air bubbles to be removed.

The tank may be configured to maximize the continuous flow rate at which air is effectively removed during the transit time in the tank. The turbulence that entrains the air as bubbles can be understood as local velocity versus an overall bulk velocity of the fluid moving through the tank. The time it takes for a bubble to rise to the surface of the fluid decreases as the velocity (both local and bulk) decreases, this is due to the inertial forces becoming less relevant compared to the buoyancy forces. As disclosed herein, the design of the system and the processes described can address at least two metrics: reducing or controlling the velocity (both bulk and local), and increasing or maximizing the dwell time by lengthening the path and slowing the bulk velocity. To achieve these metrics, flow may be introduced at the bottom of the tank underneath the separation plate. A separation plate may be placed to increase or maximize the cross-sectional area of the flow above the plate while allowing enough cross-sectional area below the plate to establish uniform flow. There may be gaps between the separation plate and the tank walls to allow large air pockets to immediately rise to the surface while restricting the flow at the wall to limit any channeling of the fluid around the separation plate. In order to transition the flow from high velocity flow in the inlet pipes to uniform lower velocity flow underneath the plate, the flow may be routed through a diffuser. In some embodiments, the inlet pipes feed a perforated diffusion pipe. In other embodiments, the flow streams from the inlet pipes are routed across a set of diffusing elements designed to create uniform flow. Other optional elements such as flow straighteners can be used to further reduce turbulence in the fluid. Once diffused flow is established under the plate, flow path elements at the end of the tank may facilitate reversing the flow for the return trip without inducing turbulence such as roll-over, which can entrain air in the process. The pump suction inlets may be positioned sufficiently below the surface and sufficiently spaced apart to mitigate or reduce the introduction of vortices, which can also entrain air.

The flow being introduced at the bottom of the tank and using a substantial portion of the length of the tank underneath the plate may establish uniform flow. The diffusion mechanism may also help establish uniform flow. The separation plate may be positioned to provide a desired final flow area (e.g., to achieve a sufficiently low average velocity to remove entrained bubbles above an average diameter, etc.). Small gaps between the plate and the tank wall may allow air bubbles with enough buoyancy to overcome flow inertia to rise through them without allowing much liquid to flow through them. Flow guiding elements may facilitate reversing of the flow from below the plate to above the plate while reducing the entrainment of any additional air. Additionally, coalescing media may be present to allow for smaller air bubbles to collect on the media and rise to the surface once the volume is sufficient for buoyancy forces to overcome surface tension with the media and flow inertia. Advantageously, these components individually and/or in combination may allow for faster and more effective deaeration of fluid with a smaller tank as compared with the conventional art.

Referring to FIG. 1, a hydronic system 1 is provided. The hydronic system 1 may include a system 2 for separating entrained gases from a liquid stream. The hydronic system 1 may further include one or more circulator pumps 3, an optional heat exchanger 4, and a hydronic loop 5 (e.g., subterranean piping). The circulator pump(s) 3 may pump liquid (e.g., water) through the heat exchanger 4 as part of the liquid stream. The heat exchanger 4 may impart heat to the liquid or remove heat from the liquid depending on the application. For example, when the hydronic loop 5 is used in a server facility, the heat exchanger 4 may be used to cool electronic equipment such as servers. In another example, the heat exchanger 4 may be used to heat a building. In a ground source heat pump setting, the heat exchanger 4 may be used to cool the fluid prior to passing the liquid through the hydronic loop 5 in the winter and heat the fluid prior to passing through the hydronic loop in the summer. From the heat exchanger 4, the liquid may flow through the hydronic loop 5, which in some embodiments may extend underground. The hydronic loop 5 may include a plurality of loops and/or may connect with other hydronic systems (e.g., in a network). In some embodiments, the liquid flowing through the hydronic loop 5 loses heat to a subterranean formation. In other embodiments, the liquid gains heat (e.g., from geothermal energy) as it flows through the hydronic loop 5. From the hydronic loop 5, the liquid may flow into the system 2 for separating entrained gasses. After the system 2 separates entrained gasses from the liquid, the gasses may be vented to atmosphere and the deaerated liquid may be directed back to the circulator pump 3. This process may continue until the entrapped air is sufficiently removed from the hydronic loop 5 and system 1.

Figure 2:
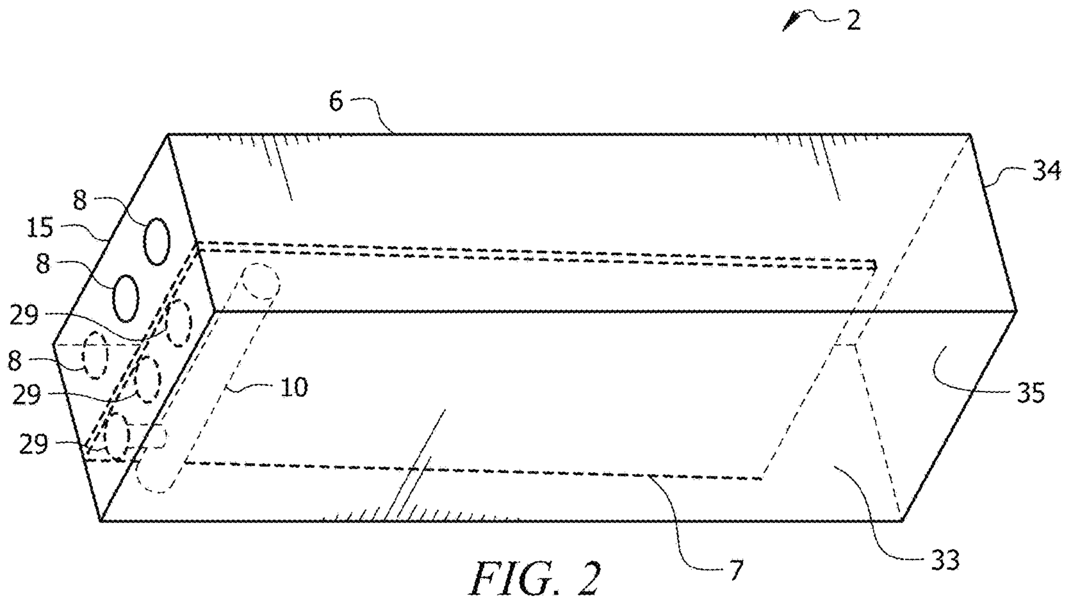
FIG. 2 is a perspective view of an air separator, according to an embodiment.
Figure 3:
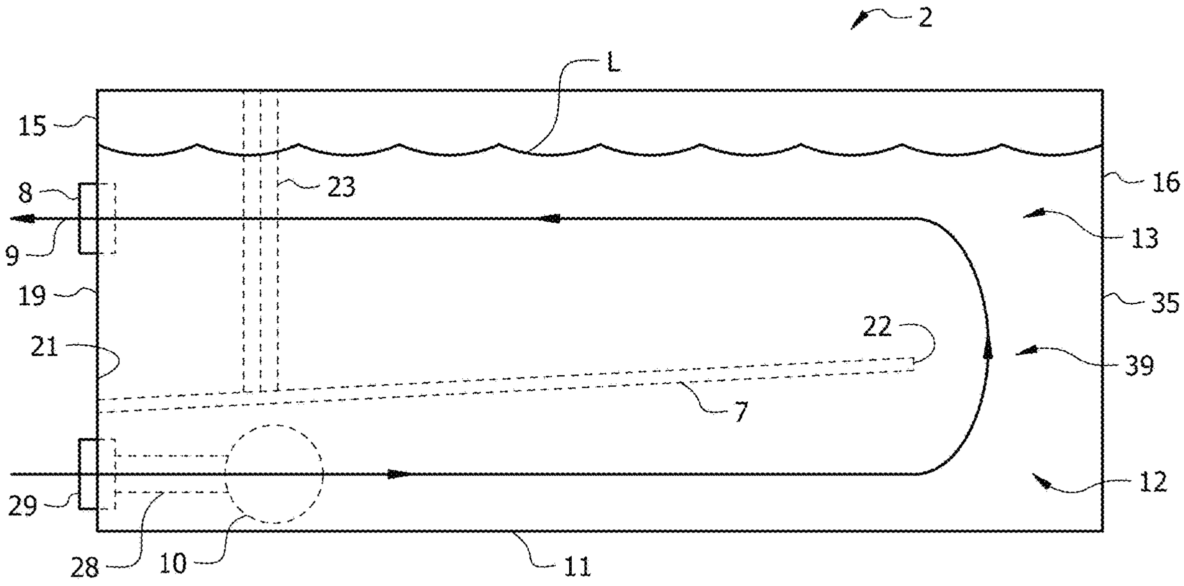
FIG. 3 is a side view of an air separator, according to another embodiment.

Referring to FIGS. 2-3, a system 2 for separating entrained gases may include a tank 6 (e.g., a rectangular tank) having an inlet 29 for receiving a liquid stream containing entrained gases, and an outlet 8 for discharging degassed liquid from the tank 6. A separation plate 7 may be disposed within a central portion 39 of the tank 6. The separation plate 7 may be attached (e.g., welded, bolted, etc.) to a wall 19 of the tank 6 on three sides. The separation plate 7 may define a flow path 9 of the liquid stream through the tank 6. The flow path 9 may extend through the inlet 29, through a diffuser 10, between the separation plate 7 and a floor 11 of the tank 6, between the separation plate 7 and a surface level L of the liquid, and through the outlet 8. The outlet 8 may be disposed between the separation plate 7 and the liquid level L within the tank 6 (e.g., at the upper portion 13). The outlet 8 may be positioned to avoid entraining air from the surface of the liquid stream during operation. The separation plate 7 may prevent the liquid from flowing directly from the inlet 29 to the outlet 8. The tank 6 may be an open-top tank. That is, the air that is separated from the liquid may be vented to atmosphere through the open top of the tank 6.

The tank 6 can comprise any suitable vessel capable of retaining a liquid. In some embodiments, the tank 6 can be or comprise a frac tank. The tank 6 can generally be rectangular or cylindrical in structure, and can be constructed from steel or other suitable material. The tank may be, for example, 10 to 60 feet long, 20 to 40 feet long (e.g., 10-30, 20-50, 15-25, or 35-50 feet long). In some aspects, the tank 6 can have a total volumetric capacity between about 5,000 gallons to about 25,000 gallons. The inlet 29 may be positioned in a lower portion 12 of the tank 6 (e.g., below an elevation at which the separation plate 7 connects to the wall 19). The outlet 8 may be positioned in an upper portion 13 of the tank, above the inlet 29 (e.g., above the elevation at which the separation plate 7 connects with the wall 19). The inlet 29 and the outlet 8 may be formed in the same wall 19. This allows the length of the flow path 9 to be about double the length of the tank 6. While shown as having the inlet 29 positioned in the lower portion 12 of the tank 6 and the outlet 8 positioned in the upper portion 13 of the tank 6, the inlet 29 and the outlet 8 can be reversed in some embodiments with the flow path extending from the upper portion 13 of the tank 6 to the lower portion 12 of the tank 6.

The separation plate 7 may be configured to lengthen the flow path through the tank 6 to extend the residence time in the tank to allow sufficient time for bubbles to rise to the surface before reaching the pump suction inlet. In some aspects, the lower portion 12 of the tank defined by the separation plate 7, the floor 11, and opposing walls 33, 34 of the tank 6 may serve as an inlet section to allow for the incoming, high velocity flow jet to disperse into a more uniform flow field with lower velocity prior to passing the fluid to the upper portion 13 of the tank defined by the separation plate 7, the surface level L, and the opposing walls 33, 34 in which the velocity can be further reduced to allow the entrained air to separate. In some aspects, a volume of the lower portion of the tank 6 may be less than a second volume of the upper portion of the tank. This may also refer to the cross-sectional flow area of the lower portion of the tank being less than the cross-sectional flow area of the upper portion of the tank, which can result in a decreased average velocity of the liquid in the upper portion of the tank relative to the average velocity in the lower portion of the tank 6. This reduction in velocity may take into account the reduction of the axial velocity resulting from the diffuser 10 (e.g., an inlet diffuser).

The separation plate 7 may be disposed substantially horizontally within the tank 6 and coupled to the wall 19 at a first end 15 of the tank 6. The separation plate 7 may terminate proximate to a second end 16 of the tank 6 without touching the wall 35 at the second end 16. A gap may be formed between the end 22 of the separation plate 7 and the wall 35 of the tank 6 to allow the liquid to flow around the end 22 of the separation plate 7. The gap may provide a cross-sectional flow area between that provided in the lower section 12 and that provided in the upper section 13 to allow for a smooth transition of the liquid flow around the end 22 of the plate.

The separation plate 7 can be substantially planar in some embodiments. In some aspects, the separation plate 7 (or a portion of the separation plate 7) can be tilted with respect to a horizontal plane. In some aspects, the separation plate 7 can be tilted upwards at the second end 22 such that the distance between the second end 22 of the separation plate 7 and the floor 11 is greater than a distance between the first edge 21 of the separation plate 7 and the floor 11. This can allow for an increasing cross-sectional flow area as the flow path extends along the lower portion 12 towards the second end 22 of the separation plate 7. The increasing cross-sectional flow area can serve to slow down the average velocity of the liquid as the turbulence is reduced in the lower portion 12 of the tank 6. In some aspects, the separation plate 7 can be tilted upwards at an angle between about 1 to about 30 degrees, between about 2 to about 20 degrees, or between about 2 to about 10 degrees relative to the plane of the floor 11.

In some aspects, the separation plate 7 may be tilted sideways with respect to the central axis of the tank 6 (e.g., one side can be higher than the other). A sideways tilt may allow any large bubbles entering the lower portion 12 to flow to an edge of the plate and pass through the one or more gaps between the edge of the separation plate 7 and the wall of the tank. In some aspects, the separation plate 7 may be tilted between 0.1 to 10 degrees sideways (e.g., at an angle of between about 80 to 89.9 degrees relative to the plane of the side wall or between about 90.1 to about 100 degrees relative to the plane of the side way). In some aspects, the separation plate 7 is substantially flat or horizontal within the tank 6.

The separation plate 7 may be coupled (e.g., welded) to the wall 19 of the tank 6 at the first edge 21. The separation plate 7 may be disposed in the tank at a height between 5%-45% (e.g., 1-50, 10-40, 20-30, 5-20, or 40-45 percent) of the height of the surface level L of the liquid within the tank 6 (e.g., as measured from the interior surface of the floor 11).

The system 2 may further include coalescing media 23 disposed in the tank 6 above the separation plate 7 (e.g., at least some of the coalescing media 23 may be between the separation plate 7 and the surface level L). The coalescing media 23 may be configured to collect and coalesce or enlarge air bubbles within the liquid stream. The coalescing media 23 may be in the form of a wire mesh or any other suitable form for collecting and enlarging air bubbles. The coalescing media 23 may be composed of small diameter strands, fibers, or wires to avoid inducing turbulence into the flowing fluid. In some aspects, the coalescing media 23 may be placed within the liquid in the tank 6, or alternatively, a current can be applied to the coalescing media 23 to further attract and coalesce the bubbles in the flowing fluid.

The diffuser 10 may be disposed in an inlet portion of the flow path 9. The diffuser 10 may be configured to receive the liquid stream from the inlet 29 and reduce the axial velocity of the liquid stream through the flow path 9 (e.g., the velocity directed parallel to the central axis or flow path through the tank 6). Due to the high volumetric flow rate, the axial velocity of the incoming liquid can result in the liquid passing through the flow path 9 as a jet. In order to reduce the axial velocity of the concentrated jet into a more uniform flow, the diffuser 10 can serve to redirect the axial velocity to disperse the concentrated flow into lower velocity uniform flow across the width of the tank. The diffuser 10 can comprise any structures suitable to reduce an incoming axial velocity of the inlet fluid such as one or more baffles, plates, inlet tubing or headers, and/or other structures as disclosed herein. Other structures that change the direction of the liquid stream are also within the scope of the present disclosure. For example, the diffuser 10 may comprise flat plates positioned at 90 degrees with respect to the direction of the liquid stream at the inlet 29.

Figure 4:
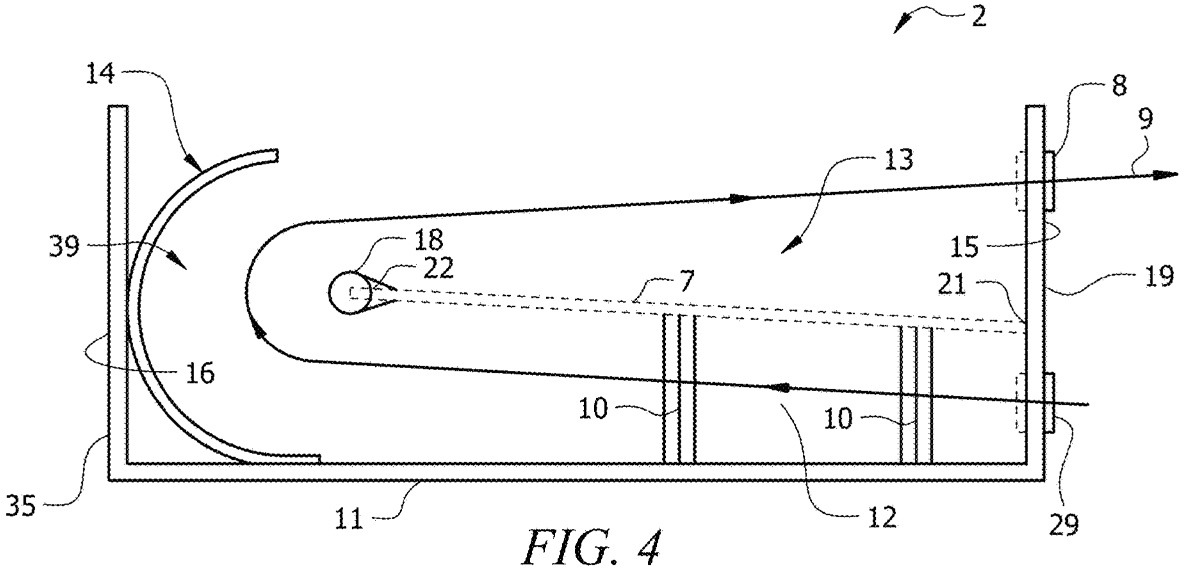
FIG. 4 is a side view of an air separator, according to yet another embodiment.
Figure 5:
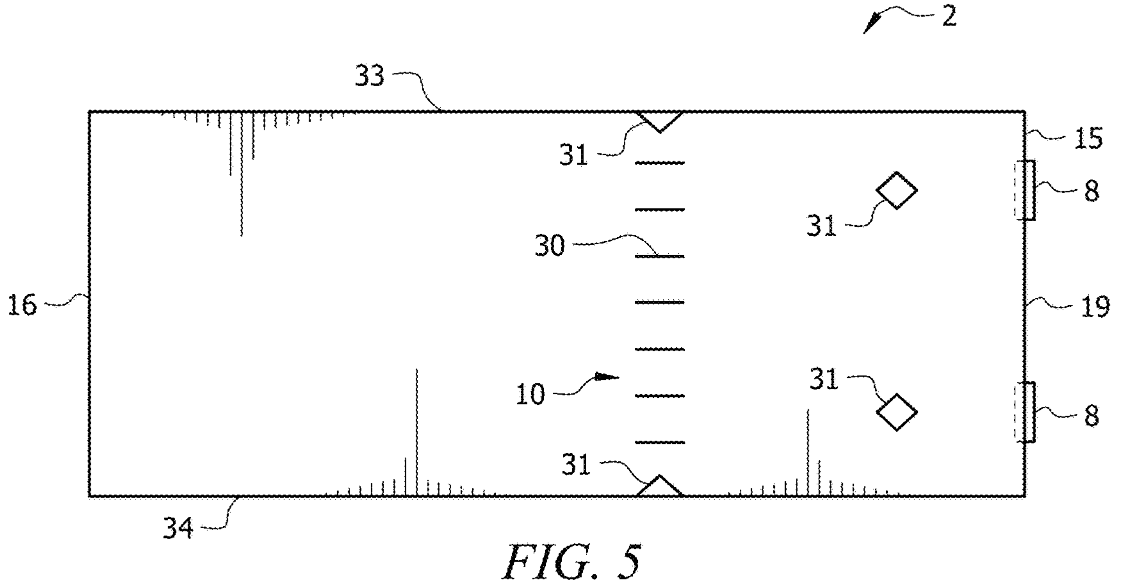
FIG. 5 is a top view of the air separator of FIG. 4 with the separation plate removed for clarity purposes.
Figure 6:
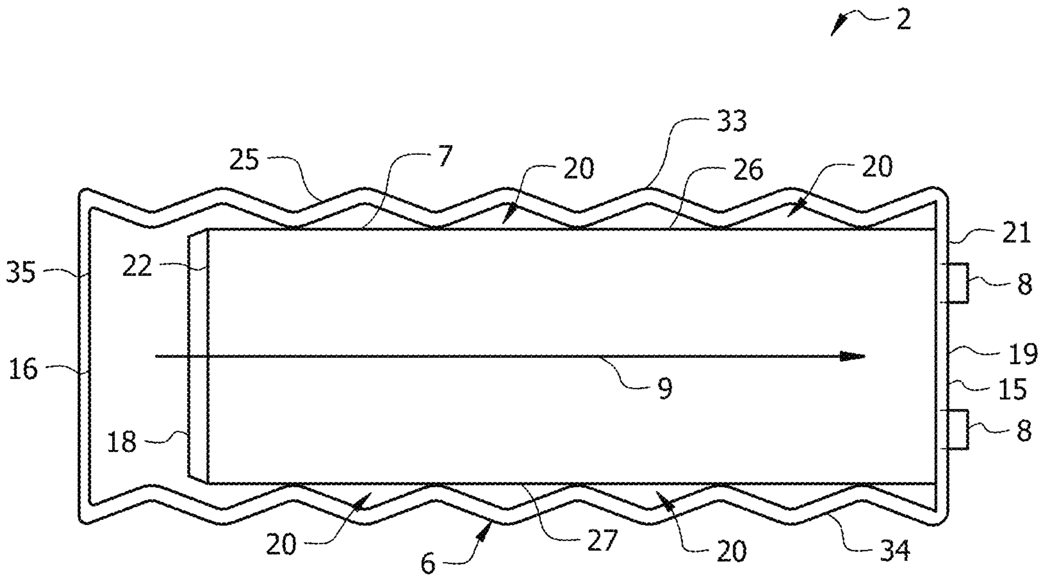
FIG. 6 is a top view of an air separator according to yet another embodiment.

Referring to FIGS. 4-6, the system 2 may further include one or more additional features to aid in the deaeration of the liquid containing the bubbles. In some aspects, the system 2 can also comprise a baffle system 14 configured to direct flow of the liquid stream in a manner that limits the introduction of turbulence to enhance gas separation. The baffle system 14 can comprise any suitable element configured to redirect the liquid flow along the flow path without introducing substantial turbulence. For example, the baffle system 14 may be comprise a curved surface at the end of the tank 6 opposite the inlet and the outlet. The curved surface may provide a similar cross-sectional flow for the liquid as the liquid changes directions around the end of the separation plate 7. In some aspects, the curved surface can be formed using a portion of a pipe (e.g., a half pipe). That is, a pipe may be cut in half length-wise and installed as the baffle system 14 in the tank 6. While described as a half-pipe, the baffle system 14 may be of any suitable configuration for directing the flow from the lower portion 12 to the upper portion 13. For example, the baffle system 14 may include a flat or curved surface connecting the floor 11 to the wall 35 and/or any flat or curved surface extending from the wall 35 to above the second edge 22 of the separation plate 7.

In addition to the baffle system 14, the system 2 may include one or more other components for guiding the flow from the lower portion 12 to the upper portion 13 while limiting or minimizing turbulence. For example, the system 2 may further include a flow cap 18 disposed within the tank 6. The flow cap 18 may include a curved surface aligned with the separation plate 7. The flow cap 18 may be configured to direct the liquid stream around the separation plate 7 (e.g., at the central portion 39) without introducing turbulence. The flow cap 18 may be a rounded end (e.g., a pipe) attached at (e.g., welded to) the second edge 22 of the separation plate 7. The flow cap 18 can avoid a sharp edge on the separation plate 7 that can induce turbulence as the liquid changes direction around the end of the separation plate 7.

As described herein, the separation plate 7 may be inclined or tilted as shown in FIG. 4, which may help slow velocity of the liquid stream in the lower portion 12. In other embodiments (e.g., see FIG. 1), the separation plate is level with the floor 11 of the tank 6. To allow air to escape directly from the lower portion of the tank to the upper portion of the tank, one or more openings 20 (e.g., see FIG. 6) may be positioned between the separation plate 7 and the opposing walls 33, 34 of the tank 6. The one or more openings 20 may be configured to allow the entrained gas to flow from below the separation plate 7 upwards past the separation plate 7. The openings 20 may be defined by corrugations 25 in the opposing walls 33, 34 of the tank 6 and edges 26, 27 of the separation plate 7. In some embodiments, in addition to or instead of the corrugations, the edges 26, 27 of the separation plate 7 may be cut (e.g., in a pattern) to form the openings 20.

The separation plate 7 may be substantially flat. When the separation plate 7 is tiled within the tank 6, the first edge 21 of the separation plate 7 may be lower within the tank 6 than the second edge 22 of the separation plate 7. The second edge 22 may be opposite the first edge 21. The separation plate 7 may be configured to divide the tank 6 into the lower portion 12 and the upper portion 13. The inlet 29 and the diffuser 10 may be disposed in the lower portion 12 of the tank 6. The outlet 8 may be disposed in the upper portion 13 of the tank 6.

Downstream of the diffuser 10 may be one or more flow straighteners 30. The flow straighteners can serve to reduce turbulence and align the flow of the liquid. The flow straighteners can comprise fins 30 downstream of the obstructions 31 that serve as part of a diffuser, where the flow straighteners may align the flow of the liquid stream. The fins 30 may extend from the floor 11 to the separation plate 7.

Figure 7:
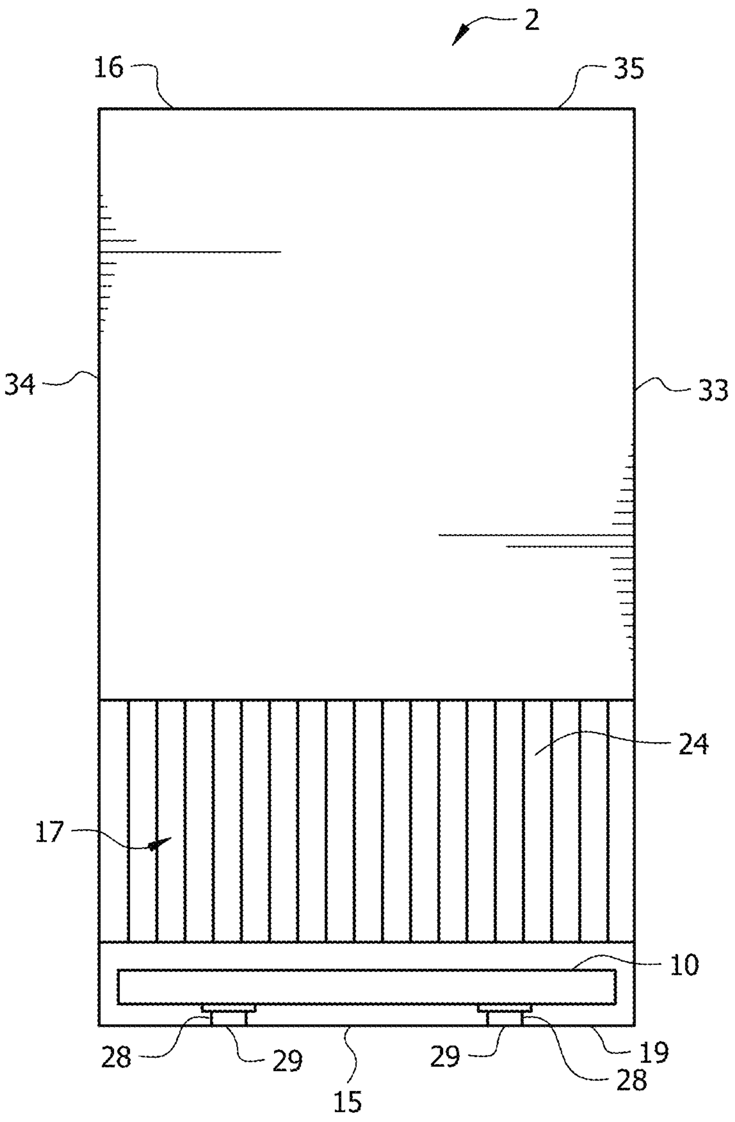
FIG. 7 is a top view of an air separator according to yet another embodiment with the separation plate removed for clarity purposes.
Figure 8:
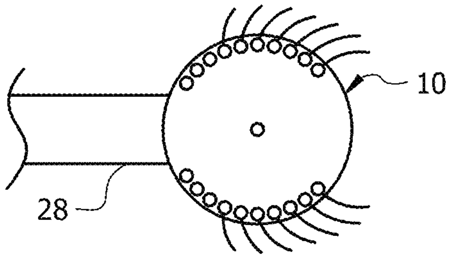
FIG. 8 is a side view of the diffuser of the air separator of FIG. 7.
Figure 9:
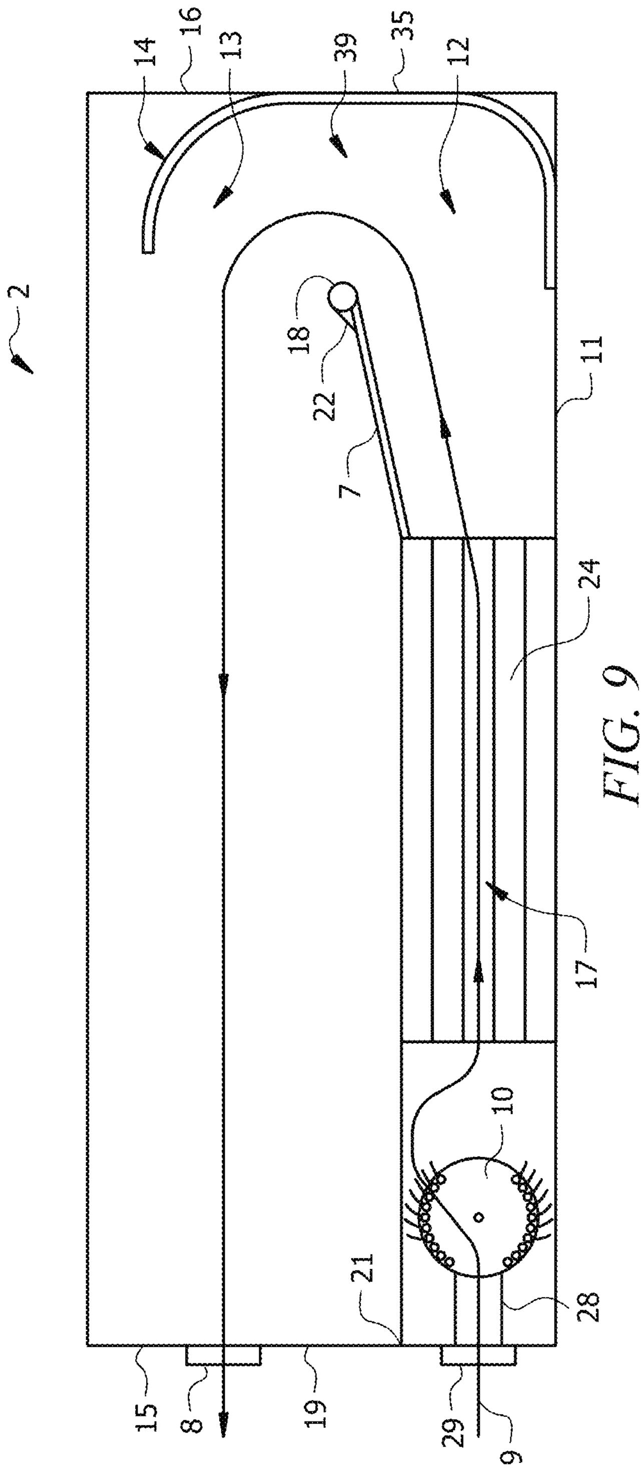
FIG. 9 is a side view of an air separator, according to yet another embodiment.

Referring to FIGS. 7-9, the system 2 can include any suitable flow straightener 17. In some aspects, the flow straightener can be disposed in the lower portion 12 of the tank 6 adjacent, and downstream of, the diffuser 10. The flow straightener 17 may be configured to reduce turbulence of the liquid stream along the flow path 9. Any suitable structures that can align the liquid flow and reduce turbulence can be used. In some aspects, the flow straightener 17 may include stacked piping 24 (e.g., parallel pipes) for promoting laminar flow below the separation plate 7 (e.g., before the flow reaches the second edge 22 of the separation plate 7). Other elements such as fins/vane straighteners (e.g., as shown in FIGS. 4 and 5), honeycomb straighteners, or the like. The flow straightener 17 may be disposed in the lower portion 12 between the diffuser 10 and the wall 35. While shown as being disposed in a lower portion 12 of the tank 6, one or more flow straighteners can be used in the upper portion 13 of the tank 6 instead of or in addition to the flow straighteners in the lower portion of the tank. For example, fin or vane type separators can be used in the upper portion of the tank near the end 22 of the separation plate 7 to align the flow after the liquid turns into the upper portion 13 of the tank 6. Flow straighteners can also be used at the turn as part of the baffle system 14 to guide the liquid around the bed while reducing or limiting the introduction of turbulence in the system.

There may be conduits or pipes 28 extending from the inlets 29 in parallel and leading to the diffuser 10 to space the diffuser from the wall 19 of the tank 6. Thus, the liquid stream may flow from the inlets 29, through the pipes 28, through the diffuser 10, through the flow straightener 17, under the separation plate 7 in the lower portion 12, over the separation plate 7 in the upper portion 13, and out through the outlet 8. In the embodiment of FIG. 9, the separation plate 7 can be level where the separation plate 7 covers the diffuser 10 and the flow straightener 17 and inclined proximate the second edge 22. However, in some embodiments, the entire separation plate 7 is level or tilted with respect to the floor 11.

Figure 10:
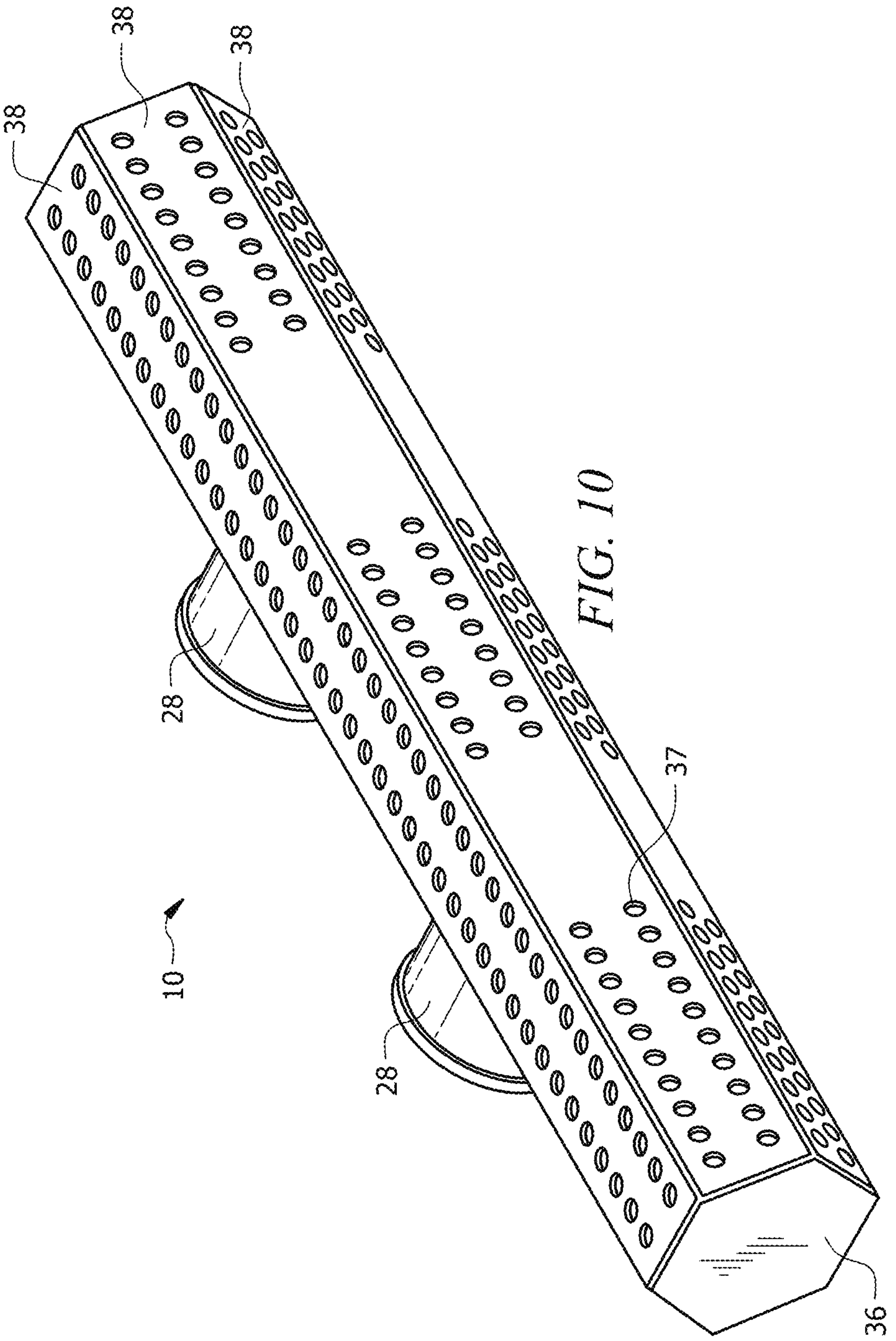
FIG. 10 is a perspective view of a diffuser for an air separator, according to another embodiment.

Referring to FIG. 10, an embodiment of the diffuser 10 is shown in more detail. The pipes 28 may extend into the body 36 of the diffuser 10, which may have a hexagonal cross section. While shown as hexagonal, other polygonal, oval, rounded shapes, or the like cross-sectional shapes can also be used. The pipes 28 may be parallel to one another, and the body 36 may be perpendicular to the pipes 28. The diffuser 10 may include a plurality of orifices or holes 37 in faces 38 of the body 36. Liquid may flow through the pipes 28, into the body 36, and through the holes 37. The use of the diffuser 10 can provide a number of benefits. The liquid flowing through the holes can result in distributing the flow more uniformly across the width of the tank and therefore the axial velocity of the liquid slowing down as it flows through the diffuser 10 and into the tank. The use of the holes can also serve to break up larger turbulence in the liquid to create a more uniform velocity that can be more easily controlled using other features such as the increased flow cross-sectional area and the optional flow straighteners. This can result in a more even liquid flow field that can allow the air bubbles to rise for removal from the liquid.

Figure 11:
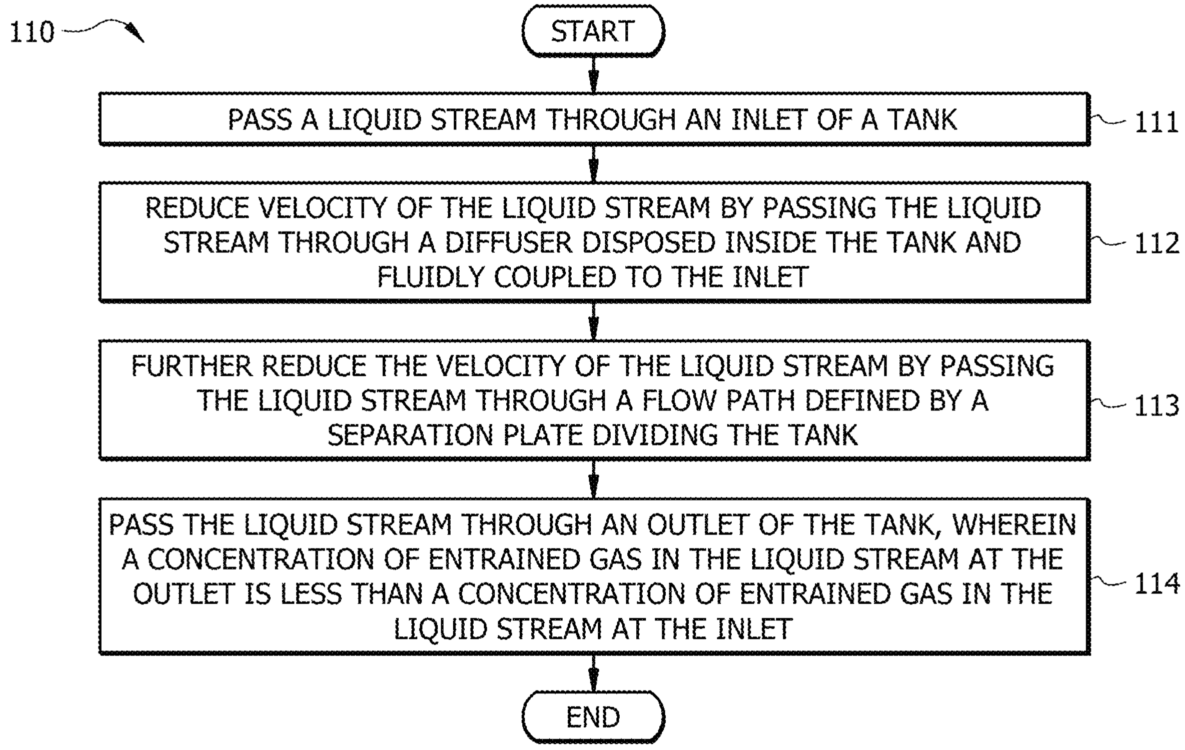
FIG. 11 is a flow diagram of a method for separating entrained gas from a liquid stream, according to an embodiment.

In addition to the systems described herein, a process or method for deaerating a liquid is also disclosed. Referring to FIG. 11, a method 110 for separating entrained gas from a liquid stream may include passing a liquid stream through an inlet of a tank (e.g., to transfer liquid from a hydronic loop to the tank) at the step 111, reducing a velocity (e.g., an axial velocity) of the liquid stream by passing the liquid stream through a diffuser disposed inside the tank and fluidly coupled to the inlet (e.g., parallel pipes lead from the inlet to the diffuser and the diffuser has holes for the liquid to pass through) at step 112; reducing the bulk flow velocity of the liquid stream by passing the liquid stream through a flow path defined by a separation plate dividing the tank (e.g., the liquid stream flows from the diffuser to a volume below the separation plate, and then the liquid stream flows over the separation plate in the opposite direction) at step 113; and passing the liquid stream through an outlet of the tank (e.g., from above the separation plate through the outlet and to the hydronic loop) at step 114. A flow volume of the upper portion of the tank may be greater than a flow volume of the lower portion of the tank. That is, a volume defined by the separation plate, the floor of the tank, and the four walls of the tank may be less than a volume defined by the separation plate, the surface level of the fluid, and the four walls of the tank. A concentration of entrained gas in the liquid stream at the outlet may be less than a concentration of entrained gas in the liquid stream at the inlet. That is, the liquid stream may have lost entrained air and the tank may have vented the air to atmosphere. The reduction in turbulence and velocity enhances the loss of entrained air. Also, the long flow path (e.g., the fluid flowing both above and below the separation plate) enhances separation of entrained air.

In some embodiments, the passing of the fluid stream through the inlet comprises flowing the liquid stream from a hydronic loop into the tank via the inlet. The passing of the liquid stream through the diffuser may include flowing the liquid stream from the inlet into a diffuser chamber, and flowing the liquid stream through holes in the diffuser chamber. The diffuser chamber may be the interior volume of the body of the diffuser. The passing of the liquid stream through the flow path may include flowing the liquid stream along a first surface of the separation plate (e.g., in the lower portion of the tank), and flowing the liquid stream along a second surface of the separation plate opposite to the first surface (e.g., in the upper portion of the tank). The passing of the liquid stream through the flow path may cause bubbles of the entrained gas to pass around the separation plate (e.g., between the walls of the tank and the edges of the separation plate). The passing of the liquid stream through the flow path may include guiding the liquid stream to reverse direction using a baffle system.

The baffle system may include a surface configured to redirect the flow of the liquid. In some aspects, the surface can be a curved surface such as a U-shaped or C-shaped surface or plate, a series of flat surfaces arranged for form a general curve, or the like. In some aspects, the surface can comprise a curved surface, and a concave side of the curved surface or plate may face the inlet and/or the outlet. The passing of the liquid stream through the flow path may include flowing the liquid stream through a flow straightener such as vanes or stacked piping disposed between the diffuser and the baffle system. The stacked piping may be arranged in parallel and may be disposed between the diffuser and the curved plate. A cross-sectional area of the flow path may increase moving from a first end of the separation plate to a second end of the separation plate. That is, the separation plate may be slanted/tilted/angled such that the first flow area at an end of the separation plate proximate the diffuser is less than a second flow area at an end of the separation plate proximate the baffle system. The cross-sectional area may be defined by the separation plate, the floor, and the four walls. A distance between the floor and the separation plate may be greater than a distance between the separation plate and a surface level of the liquid. The passing of the liquid stream through the outlet may include flowing the liquid stream from the tank to the hydronic loop via the outlet. The outlet may be disposed at a higher elevation than the inlet. The separation plate may be attached to the wall of the tank between the inlet and the outlet.

Figure 12:
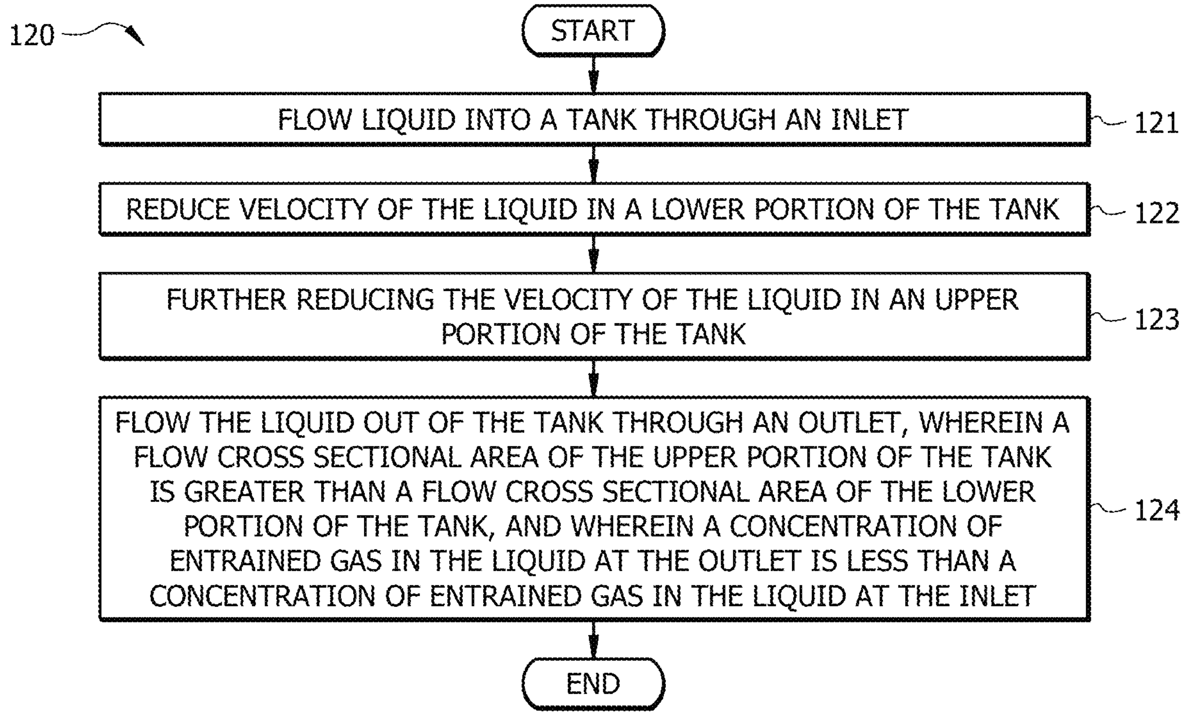
FIG. 12 is a flow diagram of a method for separating entrained gas from a liquid stream, according to another embodiment.

Referring to FIG. 12, a method 120 for separating entrained gas from liquid may include flowing liquid into a tank through an inlet (e.g., flowing liquid from a hydronic loop through the inlet into the tank) at step 121; reducing an axial velocity of the liquid in a lower portion of the tank (e.g., by flowing the liquid through a diffuser at the lower portion of the tank, where the lower portion is defined as a portion below the separation plate) at step 122; reducing the bulk velocity of the liquid in an upper portion of the tank (e.g., by the upper portion of the tank having a flow cross sectional area that is greater than a flow cross sectional area of the lower portion) at step 123; and flowing the liquid out of the tank through an outlet (e.g., flowing the liquid from inside the tank, through the outlet, and into the hydronic loop) at step 124. A concentration of entrained gas in the liquid at the outlet may be less than a concentration of entrained gas in the liquid at the inlet (e.g., due to the slowing of the liquid by the diffuser and the slowing of the liquid due to the greater flow cross sectional area in the upper portion). The flow cross sectional area of the lower portion may be defined as the cross-sectional area defined by the separation plate, the floor of the tank, and opposing walls of the tank; and the flow cross sectional area of the upper area may be defined as the cross-sectional area defined by the separation plate, the fluid level, and the opposing walls of the tank.

In some embodiments, the reducing of the axial velocity of the liquid may include reducing the velocity of the liquid by passing the liquid through a diffuser disposed inside the tank and fluidly coupled to the inlet. For example, the diffuser may have holes that have the overall effect of slowing the velocity of liquid. The further reducing of the velocity of the liquid may include flowing the liquid through a flow path in the upper portion of the tank that has increasing cross-sectional area moving from one side of the tank to another side of the tank. That is, the separation plate may be tilted such that the cross-sectional area of the lower portion is not uniform along the length of the tank. The reducing of the velocity of the liquid may include guiding the liquid to flow in a first direction in the lower portion of the tank (e.g., in a volume defined by the separation plate, the floor of the tank, and the four walls of the tank). The first direction may be away from the inlet. The method 120 may further include guiding the liquid to reverse direction inside the tank to move from the lower portion of the tank to the upper portion of the tank. For example, the liquid may reverse direction due to the baffle system, which may comprise a half-pipe. The further reducing of the velocity of the liquid may include guiding the liquid to flow in a second direction inside the upper portion of the tank (e.g., towards the outlet). The first direction may be opposite to the second direction. The flowing of the liquid into the tank may include flowing the liquid from a hydronic loop into the tank via the inlet. The guiding of the liquid to flow in the first direction may include guiding the liquid to flow along a first side of a separation plate (e.g., under the separation plate).

The separation plate may divide the upper portion and the lower portion. The guiding of the liquid to reverse direction may include guiding the liquid to reverse direction using a baffle system. The baffle system may include a C-shaped plate. The guiding of the liquid to flow in the second direction may include guiding the liquid to flow along a second side of the separation plate opposite to the first side (e.g., over the separation plate). The flowing of the liquid out of the tank may include flowing the liquid from the tank to the hydronic loop via the outlet. The outlet may be disposed at a higher elevation than the inlet. For example, the outlet may be disposed at a higher elevation than the separation plate and the inlet may be disposed at a lower elevation than the separation plate.

The following are various aspects of the present disclosure. Any of the aspects can be combined.

In a first aspect, a system for separating entrained gases from a liquid stream comprises: a tank having an inlet for receiving a liquid stream containing entrained gases; a liquid outlet for discharging degassed liquid from the tank; a separation plate disposed within a central portion of the tank, wherein the separation plate defines a flow path of the liquid stream through the tank, and wherein the separation plate is configured to reduce velocity of the liquid stream through the flow path; and an inlet diffuser disposed in an inlet portion of the flow path, wherein the inlet diffuser is configured to receive the liquid stream from the inlet and reduce the velocity of the liquid stream through the flow path.

A second aspect can include the system of the first aspect, wherein the tank is a frac tank.

A third aspect can include the system of the first or second aspect, wherein the tank is an open top tank.

A fourth aspect can include the system of any one of the first to third aspects, wherein the inlet is positioned in a lower portion of the tank.

A fifth aspect can include the system of the fourth aspect, wherein the liquid outlet is positioned in an upper portion of the tank, above the inlet.

A sixth aspect can include the system of any one of the first to fifth aspects, further comprising a baffle system configured to direct flow of the liquid stream in a manner that enhances gas separation.

A seventh aspect can include the system of any one of the first to sixth aspects, further comprising a flow straightener disposed in a lower portion of the tank adjacent the inlet diffuser, wherein the flow straightener is configured to reduce turbulence of the liquid stream along the flow path.

A eighth aspect can include the system of any one of the first to seventh aspects, wherein the separation plate is disposed substantially horizontally within the tank and coupled to a first end of the tank.

A ninth aspect can include the system of any one of the first to eighth aspects, further comprising a flow cap disposed within the tank, wherein the flow cap comprises a curved surface aligned with the separation plate, and wherein the flow cap is configured to direct the liquid stream around the separation plate without introducing turbulence.

A tenth aspect can include the system of any one of the first to ninth aspects, wherein the separation plate is coupled to a wall of the tank, wherein one or more openings are positioned between the separation plate and the wall of the tank, and wherein the one or more openings are configured to allow the entrained gas to flow from below the separation plate upwards past the separation plate.

An eleventh aspect can include the system of any one of the first to tenth aspects, wherein the separation plate is disposed in the tank at a height between 5%-45% of the height of the liquid stream within the tank.

A twelfth aspect can include the system of any one of the first to eleventh aspects, wherein the separation plate is substantially flat, wherein a first edge of the separation plate is higher within the tank than a second edge of the separation plate, and wherein the second edge is opposite the first edge.

A thirteenth aspect can include the system of any one of the first to twelfth aspects, wherein the separation plate is configured to divide the tank into a lower portion and an upper portion, wherein the inlet and the inlet diffuser are disposed in the lower portion of the tank, and wherein the liquid outlet is disposed in the upper portion of the tank.

A fourteenth aspect can include the system of any one of the first to thirteenth aspects, wherein the liquid outlet is disposed between the separation plate and a liquid level within the tank, and wherein the liquid outlet is positioned to avoid entraining air from a surface of the liquid stream during operation.

A fifteenth aspect can include the system of any one of the first to fourteenth aspects, wherein the separation plate comprises a rounded end.

A sixteenth aspect can include the system of any one of the first to fifteenth aspects, further comprising coalescing media disposed in the tank above the separation plate, wherein the coalescing media are configured to collect and enlarge air bubbles within the liquid stream.

In a seventeenth aspect, a method for separating entrained gas from a liquid stream comprises: passing a liquid stream through an inlet of a tank; reducing velocity of the liquid stream by passing the liquid stream through a diffuser disposed inside the tank and fluidly coupled to the inlet; further reducing the velocity of the liquid stream by passing the liquid stream through a flow path defined by a separation plate dividing the tank; and passing the liquid stream through an outlet of the tank, wherein a concentration of entrained gas in the liquid stream at the outlet is less than a concentration of entrained gas in the liquid stream at the inlet.

An eighteenth aspect can include the method of the seventeenth aspect, wherein the passing of the liquid stream through the inlet comprises flowing the liquid stream from a hydronic loop into the tank via the inlet.

A nineteenth aspect can include the method of the seventeenth or eighteenth aspect, wherein the passing of the liquid stream through the diffuser comprises flowing the liquid stream from the inlet into a diffuser chamber, and flowing the liquid stream through holes in the diffuser chamber.

A twentieth aspect can include the method of any one of the seventeenth to nineteenth aspects, wherein the passing of the liquid stream through the flow path comprises flowing the liquid stream along a first surface of the separation plate, and flowing the liquid stream along a second surface of the separation plate opposite to the first surface.

A twenty first aspect can include the method of any one of the seventeenth to twentieth aspects, wherein the passing of the liquid stream through the flow path causes bubbles of the entrained gas to pass around the separation plate.

A twenty second aspect can include the method of any one of the seventeenth to twenty first aspects, wherein the passing of the liquid stream through the flow path comprises guiding the liquid stream to reverse direction using a baffle system.

A twenty third aspect can include the method of the twenty second aspect, wherein the baffle system comprises a C-shaped plate.

A twenty fourth aspect can include the method of the twenty second or twenty third aspect, wherein the passing of the liquid stream through the flow path comprises flowing the liquid stream through stacked piping disposed between the diffuser and the baffle system.

A twenty fifth aspect can include the method of any one of the seventeenth to twenty fourth aspects, wherein a cross-sectional area of the flow path increases moving from a first end of the separation plate to a second end of the separation plate.

A twenty sixth aspect can include the method of any one of the seventeenth to twenty fifth aspects, wherein the passing of the liquid stream through the outlet comprises flowing the liquid stream from the tank to the hydronic loop via the outlet.

A twenty seventh aspect can include the method of any one of the seventeenth to twenty sixth aspects, wherein the outlet is disposed at a higher elevation than the inlet.

In a twenty eighth aspect, a method for separating entrained gas from liquid comprises: flowing liquid into a tank through an inlet; reducing velocity of the liquid in a lower portion of the tank; further reducing the velocity of the liquid in an upper portion of the tank; and flowing the liquid out of the tank through an outlet, wherein a flow cross sectional area of the upper portion of the tank is greater than a flow cross sectional area of the lower portion of the tank, and wherein a concentration of entrained gas in the liquid at the outlet is less than a concentration of entrained gas in the liquid at the inlet.

A twenty ninth aspect can include the method of the twenty eighth aspect, wherein the reducing of the velocity of the liquid comprises reducing the velocity of the liquid by passing the liquid through a diffuser disposed inside the tank and fluidly coupled to the inlet.

A thirtieth aspect can include the method of the twenty eighth or twenty ninth aspect, wherein the further reducing of the velocity of the liquid comprises flowing the liquid through a flow path in the upper portion of the tank that has increasing cross-sectional area moving from one side of the tank to another side of the tank.

A thirty first aspect can include the method of any one of the twenty eighth to thirtieth aspects, wherein the reducing of the velocity of the liquid comprises guiding the liquid to flow in a first direction in the lower portion of the tank.

A thirty second aspect can include the method of the thirty first aspect, further comprising guiding the liquid to reverse direction inside the tank to move from the lower portion of the tank to the upper portion of the tank.

A thirty third aspect can include the method of the thirty second aspect, wherein the further reducing of the velocity of the liquid comprises guiding the liquid to flow in a second direction inside the upper portion of the tank, wherein the first direction is opposite to the second direction.

A thirty fourth aspect can include the method of any one of the twenty eighth to thirty third aspects, wherein the flowing of the liquid into the tank comprises flowing the liquid from a hydronic loop into the tank via the inlet.

A thirty fifth aspect can include the method of the thirty third aspect, wherein the guiding of the liquid to flow in the first direction comprises guiding the liquid to flow along a first side of a separation plate, and wherein the separation plate divides the upper portion and the lower portion.

A thirty sixth aspect can include the method of any one of the twenty eighth to thirty fifth aspects, wherein the guiding of the liquid to reverse direction comprises guiding the liquid to reverse direction using a baffle system.

A thirty seventh aspect can include the method of the thirty sixth aspect, wherein the baffle system comprises a C-shaped plate.

A thirty eighth aspect can include the method of the thirty fifth aspect, wherein the guiding of the liquid to flow in the second direction comprises guiding the liquid to flow along a second side of the separation plate opposite to the first side.

A thirty ninth aspect can include the method of the thirty eighth aspect, wherein the flowing of the liquid out of the tank comprises flowing the liquid from the tank to the hydronic loop via the outlet.

A fortieth aspect can include the method of any one of the twenty eighth to thirty ninth aspects, wherein the outlet is disposed at a higher elevation than the inlet.

In a forty first aspect, a system for separating entrained gases from a liquid stream comprises: a tank having an inlet for receiving a liquid stream containing entrained gases; a liquid outlet for discharging degassed liquid from the tank, wherein the liquid outlet is disposed above the inlet in the tank; and a separation plate disposed within a central portion of the tank, wherein the separation plate defines a flow path of the liquid stream through the tank.

A forty second aspect can include the system of the forty first aspect, further comprising: an inlet diffuser disposed in an inlet portion of the flow path, wherein the inlet diffuser is configured to receive the liquid stream from the inlet and reduce the velocity of the liquid stream through the flow path.

A forty third aspect can include the system of the forty first or forty second aspect, wherein the tank is an open top tank.

A forty fourth aspect can include the system of any one of the forty first to forty third aspects, further comprising: a baffle system configured to direct flow of the liquid stream in a manner that enhances gas separation.

A forty fifth aspect can include the system of any one of the forty first to forty fourth aspects, further comprising: a flow straightener disposed in a lower portion of the tank adjacent the inlet diffuser, wherein the flow straightener is configured to reduce turbulence of the liquid stream along the flow path.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. A system for separating entrained gases from a liquid stream, the system comprising:

a tank having an inlet for receiving a liquid stream containing entrained gases, wherein the tank is an open top tank;

a liquid outlet for discharging degassed liquid from the tank;

a separation plate disposed within a central portion of the tank, wherein the separation plate defines a flow path of the liquid stream through the tank, and wherein the separation plate is configured to reduce velocity of the liquid stream through the flow path; and an inlet diffuser disposed in an inlet portion of the flow path, wherein the inlet diffuser is configured to receive the liquid stream from the inlet and reduce the velocity of the liquid stream through the flow path;

wherein the separation plate is disposed substantially horizontally within the tank and coupled to a first end of the tank, wherein the separation plate is attached to the first end of the tank on three sides, wherein the separation plate terminates at a second end of the separation plate defining a gap between the second end of the separation plate and a second wall of the tank opposite the first end of the tank, wherein the flow path is defined in a first direction in a lower portion of the tank below the separation plate from the inlet toward the second wall of the tank, and wherein the flow path is defined in a second direction in an upper portion of the tank above the separation plate toward the liquid outlet, wherein the second direction is opposite to the first direction.

2. The system of claim 1, wherein the tank is a frac tank.

3. The system of claim 1, wherein the inlet is positioned in a lower portion of the tank, and wherein the liquid outlet is positioned in an upper portion of the tank, above the inlet.

4. The system of claim 1, further comprising:

a baffle system configured to direct flow of the liquid stream in a manner that enhances gas separation.

5. The system of claim 1, further comprising:

a flow straightener disposed in a lower portion of the tank adjacent the inlet diffuser, wherein the flow straightener is configured to reduce turbulence of the liquid stream along the flow path.

6. The system of claim 1, further comprising:

a flow cap disposed within the tank, wherein the flow cap comprises a curved surface aligned with the separation plate, and wherein the flow cap is configured to direct the liquid stream around the separation plate without introducing turbulence.

7. The system of claim 1, wherein the separation plate is coupled to a wall of the tank, wherein one or more openings are positioned between the separation plate and the wall of the tank, and wherein the one or more openings are configured to allow the entrained gases to flow from below the separation plate upwards past the separation plate.

8. The system of claim 1, wherein the separation plate is disposed in the tank at a height between 5%-45% of the height of the liquid stream within the tank.

9. The system of claim 1, wherein the separation plate is substantially flat, wherein a first edge of the separation plate is higher within the tank than a second edge of the separation plate, and wherein the second edge is opposite the first edge.

10. The system of claim 1, wherein the separation plate is configured to divide the tank into a lower portion and an upper portion, wherein the inlet and the inlet diffuser are disposed in the lower portion of the tank, wherein the liquid outlet is disposed in the upper portion of the tank, and wherein the inlet and the liquid outlet are both formed in the first end of the tank.

11. The system of claim 1, wherein the liquid outlet is disposed between the separation plate and a liquid level within the tank, and wherein the liquid outlet is positioned to avoid entraining air from a surface of the liquid stream during operation.

12. The system of claim 1, wherein the separation plate comprises a rounded end.

13. The system of claim 1, further comprising:

coalescing media disposed in the tank above the separation plate, wherein the coalescing media are configured to collect and enlarge air bubbles within the liquid stream.

14. A method for separating entrained gas from a liquid stream using the system of claim 1, the method comprising:

passing the liquid stream through the inlet of the tank;

reducing the velocity of the liquid stream by passing the liquid stream through the inlet diffuser disposed inside the tank and fluidly coupled to the inlet;

further reducing the velocity of the liquid stream by passing the liquid stream through the flow path defined by the separation plate dividing the tank; and passing the liquid stream through the liquid outlet of the tank, wherein a concentration of entrained gas in the liquid stream at the outlet is less than a concentration of entrained gas in the liquid stream at the inlet.

15. The method of claim 14, wherein the passing of the liquid stream through the inlet comprises flowing the liquid stream from a hydronic loop into the tank via the inlet.

16. The method of claim 15, wherein the passing of the liquid stream through the outlet comprises flowing the liquid stream from the tank to the hydronic loop via the outlet.

17. The method of claim 14, wherein the passing of the liquid stream through the diffuser comprises flowing the liquid stream from the inlet into a diffuser chamber, and flowing the liquid stream through holes in the diffuser chamber.

18. The method of claim 14, wherein the passing of the liquid stream through the flow path comprises flowing the liquid stream along a first surface of the separation plate, and flowing the liquid stream along a second surface of the separation plate opposite to the first surface.

19. The method of claim 14, wherein the passing of the liquid stream through the flow path comprises:

guiding the liquid stream to reverse direction using a baffle system, wherein the baffle system comprises a C-shaped plate; and flowing the liquid stream through stacked piping disposed between the diffuser and the baffle system.

20. The method of claim 14, wherein a cross-sectional area of the flow path increases moving from a first end of the separation plate to a second end of the separation plate.

21. The method of claim 14, wherein the outlet is disposed at a higher elevation than the inlet.

22. A system for separating entrained gases from a liquid stream, the system comprising:

a tank having an inlet for receiving a liquid stream containing entrained gases;

a liquid outlet for discharging degassed liquid from the tank, wherein the liquid outlet is disposed above the inlet in the tank; and a separation plate disposed within a central portion of the tank, wherein the separation plate defines a flow path of the liquid stream through the tank, wherein a cross-sectional area of the flow path increases from the inlet to the outlet;

wherein the tank is an open top tank, wherein the separation plate is attached to the first end of the tank on three sides, wherein the separation plate terminates at a second end of the separation plate defining a gap between the second end of the separation plate and a second wall of the tank opposite the first end of the tank, wherein the flow path is defined in a first direction in a lower portion of the tank below the separation plate from the inlet toward the second wall of the tank, wherein the flow path is defined in a second direction in an upper portion of the tank above the separation plate toward the liquid outlet, wherein the second direction is opposite to the first direction, and wherein the inlet and the liquid outlet are both formed in the first end of the tank.

23. The system of claim 22, further comprising:

an inlet diffuser disposed in an inlet portion of the flow path, wherein the inlet diffuser is configured to receive the liquid stream from the inlet and reduce a velocity of the liquid stream through the flow path, and wherein the inlet diffuser is downstream from and spaced apart from the inlet of the tank.

24. The system of claim 23, further comprising:

a flow straightener disposed in a lower portion of the tank adjacent the inlet diffuser, wherein the flow straightener is configured to reduce turbulence of the liquid stream along the flow path.

25. The system of claim 22, further comprising:

a baffle system configured to direct flow of the liquid stream in a manner that enhances gas separation.

* * * * *